Sept. 9, 1924.                                                    1,507,931
                        W. PROCKTER
                           HOIST
                    Filed Dec. 30, 1921            3 Sheets-Sheet 3
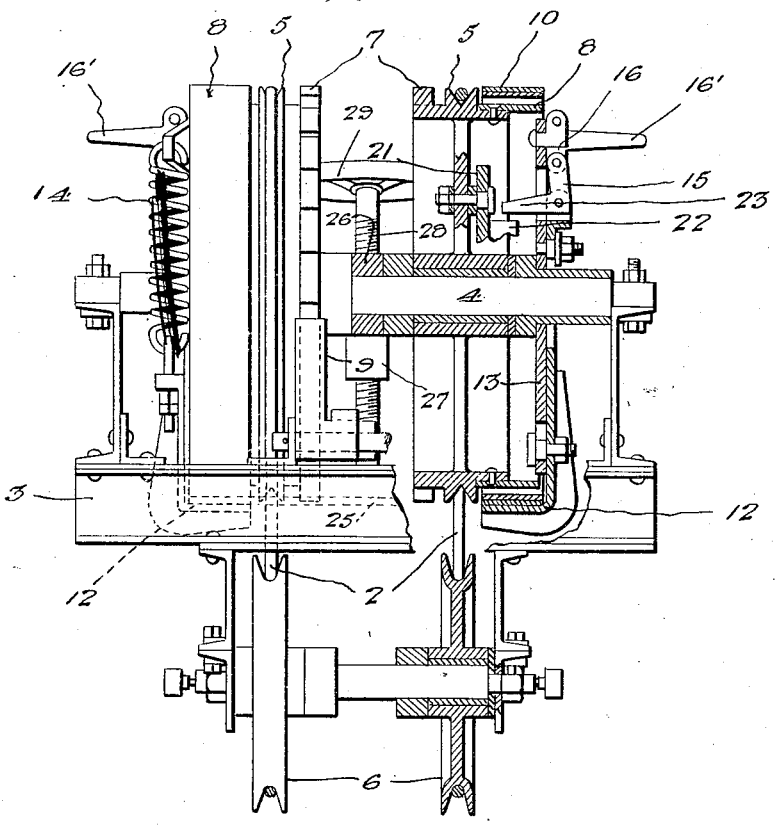
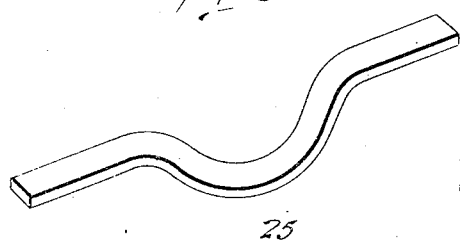
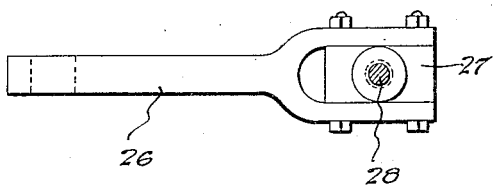

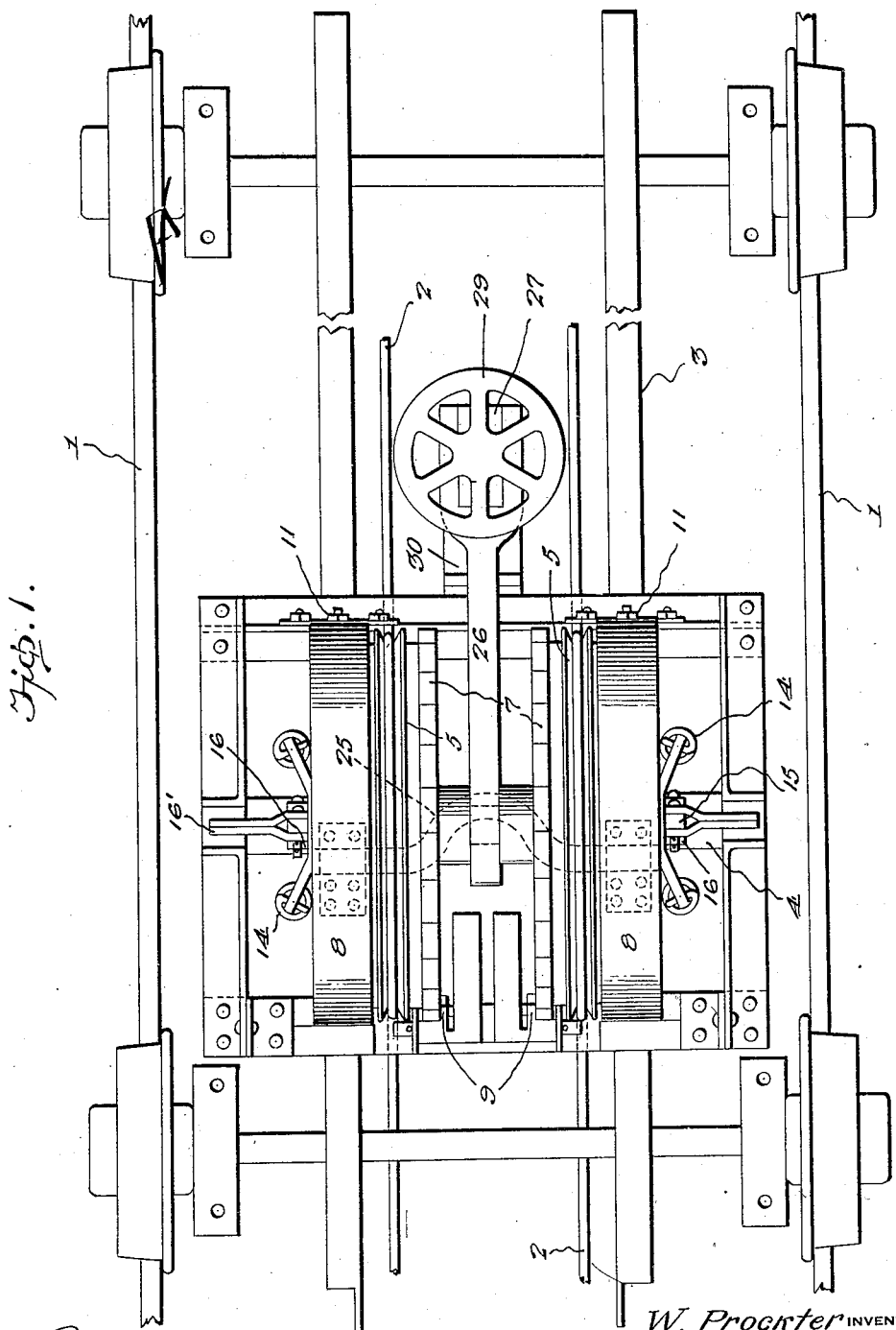

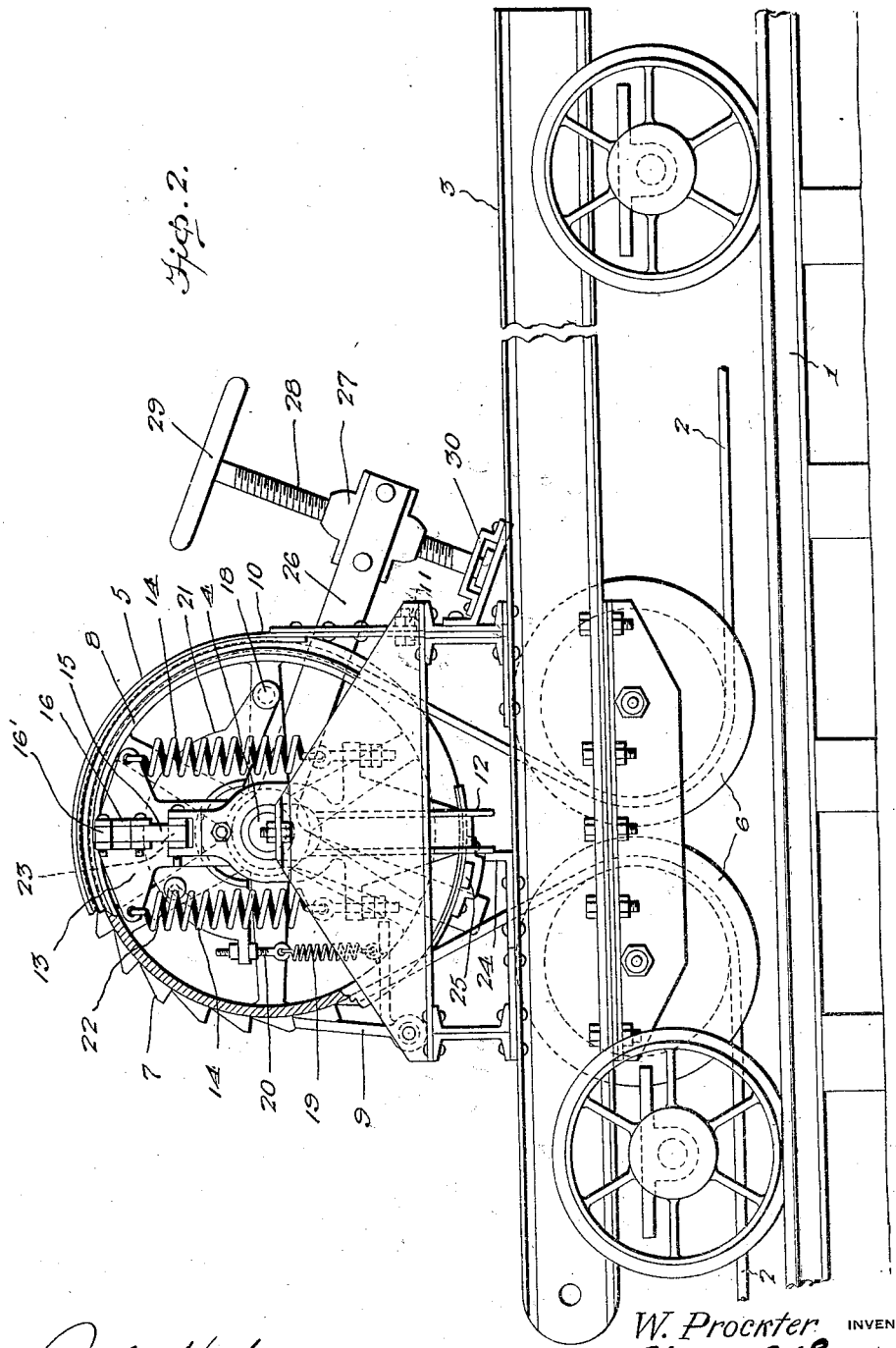

Patented Sept. 9, 1924.

1,507,931

UNITED STATES PATENT OFFICE.

WALTER PROCKTER, OF HUNTINGTON, WEST VIRGINIA.

HOIST.

Application filed December 30, 1921. Serial No. 525,862.

*To all whom it may concern:*

Be it known that I, WALTER PROCKTER, a citizen of the United States, residing at Huntington, in the county of Cabell and State of West Virginia, have invented new and useful Improvements in Hoists (Case B), of which the following is a specification.

This invention relates to safety hoists for use on cars operating on inclined planes, the principal object of the invention being to provide a governor operated means for gripping one or more cables if any part of the hoist device should break, the governor being actuated when the speed of the car exceeds a certain point.

This invention is an improvement over my Patent No. 1,410,118, dated March 22, 1922.

A further object of the invention is to provide means whereby the gripping or braking means can be applied manually.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.

Figure 2 is a side view.

Figure 3 is an end view with parts in section.

Figure 4 is a view of the lever 26 and its nut 27.

Figure 5 is a perspective view of the bar 25.

In these views 1 indicates the track and 2 the safety cables which lie on the track and have their ends attached to suitable supports of sufficient strength to carry the weight of the car. The car is indicated at 3, and 4 indicates a shaft or axle suitably mounted in the car. This shaft or axle has rotatably mounted thereon a pair of master sheaves 5 over which the cables 2 pass and 6 indicates two pairs of sheaves, one pair of which is associated with each master sheave, and which are arranged below the master sheave so that each cable will pass over one of the sheaves 6, around the master sheaves and then around the second sheave 6. This forms a loop in the cable which has 240° of contact with the master sheave. Each master sheave has associated therewith a rack 7 and a brake drum 8, the rack being engaged by a pawl 9 and the drum by the brake band 10, one end of which is permanently fastened, as at 11, and the other end of which is connected to the clamp 12 which consists of a hook-shaped member slidably connected with a bracket 13. Springs 14, having their ends connected with the clamp and with the upper part of the bracket, tend to hold the clamp in raised position with the brake band gripping the brake drum. The parts are normally held with the brake released and the springs expanded by means of the pivoted links 15 and 16 which form a stiff joint to hold the parts with the brake in its released position. The link 16 is provided with a handle 16' so that the links can be moved to release the springs to permit them to apply the brakes by hand. A governor weight 21 is pivotally connected with each master sheave, as at 18, and a spring 19 tends to hold the governor in inoperative position, this spring being adjustable, as shown at 20. The governor weight 21 carries a projection 22 which is adapted to strike an inwardly extending part 23 on link 15, when the weight moves outwardly under the action of centrifugal force, when the speed of the sheave exceeds that for which the governor spring 19 is set. This will throw the links out and over their dead center, thus allowing the springs 14 to pull the clamp and the brake band against the drum and thus apply the brakes. The bracket 13 floats on the main shaft within the necessary limits to take care of wear on the brake lining. When the brakes are applied the master sheaves are held against rotation and thus the movement of the car is stopped by the gripping of the stationary cables 2 by the sheaves. Each sheave assembly is independent of the other though they work in unison by having the adjustments of the governors the same. This will insure stoppage of the car even though one braking means should fail to work.

A stop 24 is provided to engage the clamp 13 if the brakes should become set while a car is ascending a hill due to excessive speed. It will be noted that the brake will only offer its minimum resistance to the movement of the car in its travel ascending and the maximum resistance in the descending direction of the car. The pawl and ratchet is intended to be used only when the car is ascending at an incline and as an additional safety guard.

I also provide means for applying the brake bands manually. Such means comprises a cranked bar 25 having its ends attached to the brake bands and its crank engaged by one end of the bell crank lever 26 which is pivoted to shaft 4 and is adjusted by means of the nut 27 engaging the forked end of said lever and carried by a screw shaft 28 which has a handle 29 at its upper end and its lower end swiveled in a bracket 30. Thus by rotating the shaft the bell crank will be adjusted to move the bar 25 to apply or release the brakes. The end of the lever engaging the crank in said bar will compensate for any unevenness in the wear of the brake bands. By this arrangement of parts the brakes can be applied independently of the governor.

By this invention speed of the car is automatically controlled and if anything should happen to the hoisting means the car would be prevented from running away as the governor would come into action and apply the brakes.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a car and its track, a safety cable placed along the track, a master sheave, a pair of sheaves placed close together adjacent the master sheave for holding the cable in a loop around the master sheave, a brake associated with the master sheave, spring means for holding the brake in applied position, toggle links for holding the brake in inoperative position and a governor on the master sheave having a part arranged to engage a part on one of the links for moving the links when the speed of the master sheave exceeds a certain point.

2. In combination with a car and its track, a safety cable placed along the track, a master sheave, a pair of sheaves placed close together adjacent the master sheave for holding the cable in a loop around the master sheave, a brake associated with the master sheave, spring means for holding the brake in applied position, toggle links for holding the brake in inoperative position, a governor on the master sheave having a part arranged to engage a part on one of the links for moving the links when the speed of the master sheave exceeds a certain point and a handle associated with the toggle links for braking them by hand.

3. In combination with a car and its track, a safety cable placed along the track, a master sheave, a pair of sheaves placed close together adjacent the master sheave for holding the cable in a loop around the master sheave, a brake associated with the master sheave, spring means for holding the brake in applied position, toggle links for holding the brake in inoperative position, a governor on the master sheave having a part arranged to engage a part on one of the links for moving the links when the speed of the master sheave exceeds a certain point, a handle associated with the toggle links for braking them by hand and manually operated means for applying the brake independently of the governor and links.

4. In combination with a car and its track, a pair of safety cables placed along the track, a pair of master sheaves over which the cables pass, a pair of guiding sheaves associated with each master sheave, a brake band engaging each master sheave, spring means for holding the band in inoperative position, a bar having its ends connected with each brake band, a bell crank lever connected with the bar, manually operated means for moving the bell crank to contract the brake bands and governor means on each master sheave for contracting the brake band when the speed of the master sheave reaches a certain point.

In testimony whereof I affix my signature.

WALTER PROCKTER.